United States Patent [19]

Culp

[11] Patent Number: 5,144,187
[45] Date of Patent: Sep. 1, 1992

[54] PIEZOELECTRIC MOTOR

[75] Inventor: Gordon W. Culp, Van Nuys, Calif.

[73] Assignee: Rockwell International Corporation, Seal Beach, Calif.

[21] Appl. No.: 737,819

[22] Filed: Jul. 29, 1991

Related U.S. Application Data

[63] Continuation of Ser. No. 498,125, Mar. 23, 1990, abandoned.

[51] Int. Cl.$^5$ .................................................. H01L 41/08
[52] U.S. Cl. ...................................... 310/328; 310/323
[58] Field of Search ....................... 310/323, 328, 317

[56] References Cited

U.S. PATENT DOCUMENTS

| 4,562,374 | 12/1985 | Sashida | 310/328 |
| 4,782,262 | 11/1988 | Kiyo-Oka | 310/328 X |
| 5,068,565 | 11/1991 | Huang | 310/328 |

FOREIGN PATENT DOCUMENTS

| 0022477 | 2/1985 | Japan | 310/328 |
| 0229680 | 11/1985 | Japan | 310/328 |
| 0137377 | 6/1986 | Japan | 310/323 |
| 61-142978 | 6/1986 | Japan | 310/328 |
| 0142979 | 6/1986 | Japan | 310/328 |
| 526990 | 11/1976 | U.S.S.R. | 310/331 |
| 0612357 | 6/1978 | U.S.S.R. | 310/328 |
| 0851565 | 7/1981 | U.S.S.R. | 310/328 |

Primary Examiner—Mark O. Budd
Attorney, Agent, or Firm—H. Fredrick Hamann; Harry B. Field; Steven E. Kahm

[57] ABSTRACT

A rotary motor uses a plurality of radially acting piezoelectric actuators to impart rotation to a motor shaft having surface undulations. Electrical charge distributed to the actuators causes radial actuator motion resulting in contact between the actuators and the sloped sides of the shaft undulations. The slope of each undulation transforms the radial force into tangential force that rotates the shaft. The slope of the shaft undulations provides a mechanical advantage that transforms the slow radial speed of the actuators into greater shaft rotational speed. The shaft undulations can be made in any desired or easily fabricated shape. The electrical actuation control signals can be modified electrically to produce appropriate radial actuator motion to match the undulations of the shaft. Electric charge can be shared among actuators by using switches or other circuitry. Efficiency can be increased further by using acoustic excitation and by using rollers for contact between the actuators and the shaft.

12 Claims, 2 Drawing Sheets

PIEZOELECTRIC MOTOR

This is a continuation of copending application Ser. No. 07/498,125 filed on Mar. 23, 1990, now abandoned.

TECHNICAL FIELD

The present invention relates to piezoelectric devices and, in particular, to a rotary motor having radially acting piezoelectric actuators.

BACKGROUND OF THE INVENTION

Conventional electromagnetic motors generally require provisions for removal of heat. Heat is produced in electric motors and generators by electrical resistance and the sliding friction of slip rings, brushes, and commutators that transmit power between fixed and rotating structures. The conduction of even moderate currents through sliding contacts repeatedly welds and breaks the contacts, causing a continual rearrangement of conducting material. As a result, contact surfaces become rougher with continued use. Brushes, which have a relatively small contact surface area, generally wear out faster than rings. These characteristics of resistive heating, contact welding, and short lifetime of motor parts make conventional electric motors unsatisfactory in some applications and environments.

The limitations of electric motors in environments such as outer space has led to the investigation of alternative types of transducers, actuators, and motors. Piezoelectric devices, for example, have advantages of weight and efficiency that are important considerations for applications in space. Piezoelectric actuators have limited actuation speed, however, and known piezoelectric motors are not capable of high speed operation. Thus, there is a need for a high speed, high efficiency piezoelectric motor for performing work in severe environments and remote locations.

SUMMARY OF THE INVENTION

The present invention comprises a rotary motor in which a plurality of radially acting piezoelectric actuators impart rotation to a shaft having surface undulations. Electrical signals are distributed to the actuators to cause intermittent contact between the actuators and the sloped sides of the shaft undulations. The slope of each undulation transforms the intermittently applied radial force into tangential force that rotates the shaft. The slope of the shaft undulations provides a mechanical advantage that transforms the slow radial speed of the actuators into greater shaft rotational speed.

Position of the actuators is determined by the applied electrical signals. If the electrical source is a constant potential, connection of the source to an actuator causes a sinu-exponential motion. In this case, the shaft undulations are made to be sinu-exponential to match the actuator movement. However, the shaft undulations can be made in any desired or easily fabricated shape, and the actuation signals can be modified electrically to produce actuator motion that matches the undulations. Electric charge can be shared among actuators by using switches and other circuitry. Efficiency can be increased further by using acoustic excitation and by using rollers for contact between the actuators and the shaft.

BRIEF DESCRIPTION OF THE DRAWINGS

For a more complete understanding of the present invention and for further advantages thereof, the following Description of the Preferred Embodiments makes reference to the accompanying Drawings, in which the same reference numerals refer to the same or similar elements in the several figures, and in which.

DESCRIPTION OF THE PREFERRED EMBODIMENTS

Figure 1:
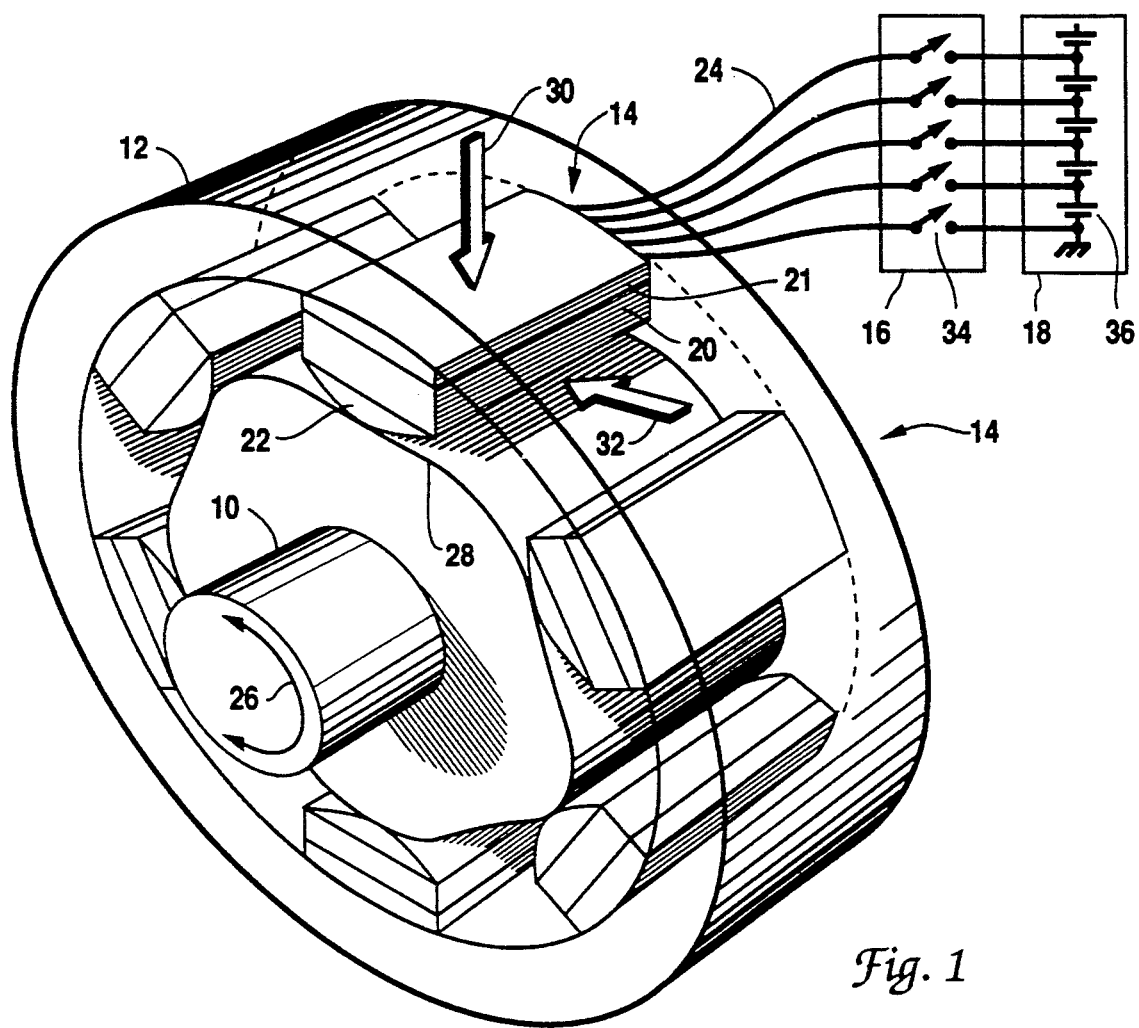
FIG. 1 is a perspective view of a piezoelectric motor of the present invention illustrated with a transparent housing and including a block diagram of an electrical control circuit.

One embodiment of the rotary motor of the present invention is illustrated in FIG. 1. The motor comprises a motor housing 12 (shown as transparent for purposes of illustration only), a rotatable motor shaft 10 having surface undulations 28, and a plurality of radially acting piezoelectric actuators 14 disposed within housing 12 and surrounding undulations 28 of shaft 10. Each actuator 14 comprises a piezoelectric body 20, a base 21 attaching body 20 to housing 12, and a crown 22 affixed to body 20 opposite base 21. An electrical controller 16, illustrated as including a plurality of electrical switches such as switch 34, is connected to an electrical source 18, illustrated as comprising a plurality of electrical cells such as cell 36. Each body 20 of each actuator 14 may include one or more piezoelectric segments, each of which is connected to controller 16 by an electrical lead, such as lead 24.

During operation of the motor, electrical charge from source 18 is distributed by controller 16 to actuators 14, causing actuators 14 to cycle radially, as indicated by radial force arrow 30. Radial force 30 acting on the slope of undulations 28 creates a tangential force, as indicated by arrow 32. The averaged sum of tangential forces 32 generated by the radial forces 30 of the plurality of actuators 14 rotates shaft 10 clockwise or counterclockwise about its axis, as indicated by arrows 26. At appropriate times in the cycle, each actuator 14 reduces force 30 and/or lifts crown 22 clear of undulations 28 so as not to impede shaft rotation. Undulations 28 may be symmetric in motors with shafts that rotate equally well in either direction, but they may be asymmetric in undirectional motors. Undulations 28 are analogous to cams on a rotating shaft that apply force to actuator rods, as is well known in the prior art, but in the present invention actuators 14 apply force to undulations 28 to cause rotation of shaft 10.

The highest rates of rotation of shaft 10 can be achieved by connecting actuators 14 directly to sources of constant electrical potential. For example, electric current will flow from cell 36 to actuator body 20 immediately upon closure of switch 34. In this circuit, piezoelectric actuator body 20 functions electrically as a capacitor. The current int he circuit as a function of time is a product of a sinusoid and an exponential decay. The sinusoidal factor results from the capacitance and inductance of the circuit, while the exponential factor results from the resistance. The smallest practical values of resistance and inductance offer the most rapid piezoelectric excitation, resulting in well known damped oscillations of voltage and current. The fastest motor results from the connection of all the piezoelectric actuators 14 to the highest potential available from source 18.

Figure 2A:
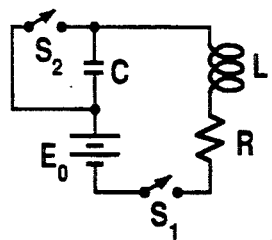
FIG. 2 is a simplified schematic diagram of an electrical control circuit for driving an actuator of the motor shown in FIG. 1.
FIG. 2B is a plot of normalized electrical charge Q as a function of time for the circuit of FIG. 2A.

FIG. 2A illustrates a simplified schematic diagram of an electrical excitation system for the motor of the present invention. In FIG. 2A, C represents the capacitance of a piezoelectric actuator body 20 or segment thereof, L represents the sum of the inductances of the components and wiring, R represents the sum of the resistances of the components and wiring, $E_0$ represents the constant electrical potential provided by cell 36, and $S_1$ and $S_2$ represent electrical switches.

Figure 2B:
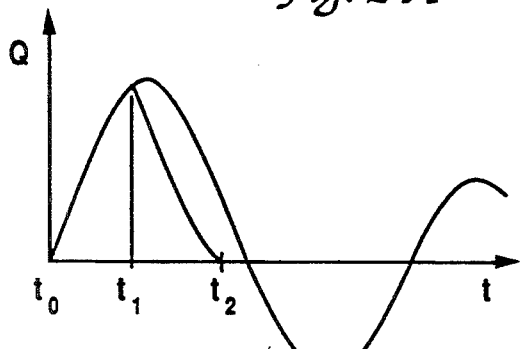

FIG. 2B is a plot of electrical charge Q on actuator C as a function of time for the circuit of FIG. 2A. At time $t_0$ switch $S_1$ is closed and electric charge Q on actuator C rises sinu-exponentially, as is well known in the field of electric circuit theory and illustrated by the solid line of FIG. 2B. The plot of charge Q corresponds to the actual position of actuator crown 22 within the limits of piezoelectric reaction. As illustrated, charge Q accumulates sinu-exponentially until the desired maximum stroke of crown 22 is reached at time $t_1$. The smoothly decaying sinusoidal line indicates the time variation of charge Q if no further changes are made in the circuit. However, at time $t_1$ switch $S_1$ is opened and switch $S_2$ is closed causing an immediate sinu-exponential drop of charge Q and a corresponding sinu-exponential movement of crown 22 until time $t_2$, at which point the actuation cycle may be repeated. By way of example, a cubic inch of lead-zirconate-titanate piezoelectric material reaches its $t_1$ position in about 5 microseconds.

Activation of actuators 14 in unison is appropriate when the number of undulations 28 is equal to the number of actuators 14. In this case, housing 12 experiences essentially uniform internal pressure during the torque portion of each cycle, thereby minimizing bending moments of housing 12 about the bases 21 of actuators 14. Sequential activation of actuators 14 is appropriate when there are more shaft undulations 28 than actuators 14. Sequential operation provides the benefit of smooth torque applied to shaft 10, particularly when the timing provides overlapping actuator strokes. Sequential actuation demands the least current form electrical source 18 and provides smooth, quiet operation of the motor.

Optimum performance of the motor of the present invention requires matching of shaft undulation shape with actuator motion. For example, shaft undulations 28 may be formed in an easily fabricated shape, and actuator motion may be matched to that shape by piecewise approximation of the required charge transfer time function by controller 16. This may be accomplished by using various combinations of piezoelectric segments, electrical source segments, switching times, and electrical circuitry as is well known in the prior art. When a switched, constant potential source 18 is used, undulations 28 of shaft 10 are shaped to be sinu-exponential, thereby allowing application of a nearly constant force 30 on shaft 10 during the torque portion of each actuator cycle. The remainder of each cycle comprises forceless retracing or complete removal of crown 22 from contact with undulations 28 of shaft 10. The motion of crown 22 is controlled by electrical controller 16, which may comprise any combination of switches and other electrical circuit elements as described above. Various portions of the slopes of undulations 28 may be used to provide a range a range of shaft speed and torques by electrically adjusting the actuator timing and slew rates. Reciprocity of piezoelectric actuators may be utilized to provide feedback information on shaft angular position and actuator contact force by the extraction of self-generated piezoelectric signals. Feedback to electrical controller 16 also may be provided by conventional shaft angle encoders as is known in the prior art.

For embodiments of the present invention in which actuators 14 act in unison, it is possible for all actuator crowns 22 to fall on the still crests or valleys of undulations 28, thereby preventing motor start-up. In this embodiment, start-up can be guaranteed by providing segments of piezoelectric bodies 20 that act tangentially on undulations 28. At start-up, the tangentially acting segments can be actuated to initiate shaft rotation. When rotation speed reaches a speed range controllable by the main radially acting piezoelectric segments of actuators 14, the tangential segments may be deactivated or used to make continuous adjustments to the relative position of undulations and actuator crowns; to sense tangential force and measure torque; or to adjust actuator crown position for thermal expansion or wear changes.

Because the strokes of piezoelectric actuators 14 are inherently short, the shaft undulations 28 must be small. As a result, friction between actuator crowns 22 and shaft undulations 28 must be reduced to the lowest practical value for effective operation of the motor of the present invention.

Figure 3:
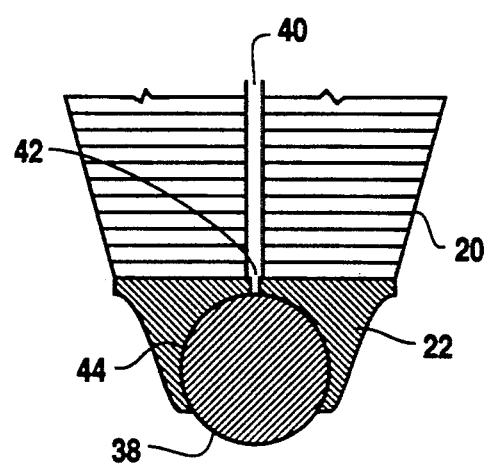
FIG. 3 is a cross-section of an actuator having a rolling element for contact with the shaft of the motor of FIG. 1.

FIG. 3 illustrates an embodiment of an actuator 14 designed to reduce contact friction between the actuator and the shaft. FIG. 3 is a cross-section of a portion of an actuator showing crown 22 attached to piezoelectric body 20. Crown 22 is formed to hold a rolling element 38. In the embodiment shown in FIG. 3, the rolling element is a cylindrical roller 38 seated within and confined by crown 22, but free to rotate about its axis. Lubricating fluid is supplied by a pipe 40 and one or more orifices 42 to form a thin film at the interface 44 between roller 38 and crown 22. This embodiment reduces the coefficient of friction to a low value, thereby allowing a large range of actuator sizes and piezoelectric strokes. In severe environments, other lubricating means may be devised, such as fluid seals and recovery systems, fluid-free rolling elements, and acoustic excitation systems.

Figure 4:
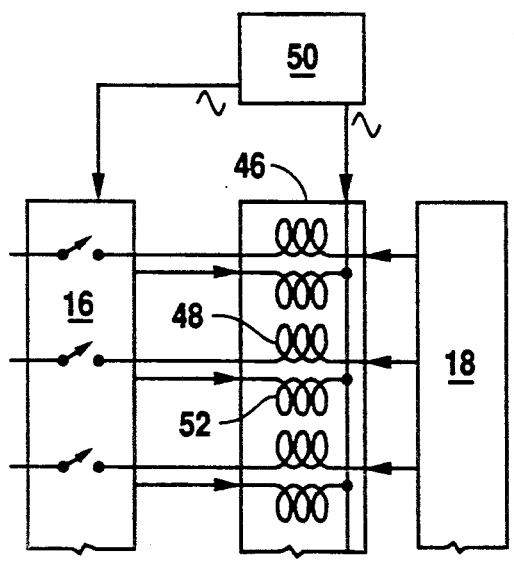
FIG. 4 is a simplified schematic diagram of an electrical control circuit including an acoustic excitation circuit.

FIG. 4 illustrates an example of an acoustic excitation system added to the motor, source 18, and controller 16 of FIG. 1. In FIG. 4, an acoustic exciter 46 is shown connected between the electrical source 18 and the electrical controller 16. For each electrical pathway connecting source 18 to a piezoelectric body 20 or segment thereof, exciter 46 comprises a transformer having a primary winding 52 and a secondary winding 48. A source of alternating current 50 is connected to all the primary windings 52. The AC current supplied to primary windings 52 induces AC signals in secondary windings 48. The AC signals are transduced by piezoelectric bodies 20, thereby causing small amplitude vibrations of crown 22 added to the large amplitude actuator strokes. The added vibrations effectively reduce the time that crown 22 (or roller 38) is in contact with shaft undulations 28, thereby reducing the contact friction. Other embodiments of exciter 46 may include capacitive coupling of the alternating current, for example. Embodiments of the motor having piezoelectric actuators that do not act in unison benefit from separate excitation couplings that allow deactivation of the AC excitation during non-torquing portions of the actuator cycles to conserve energy.

Figure 5:
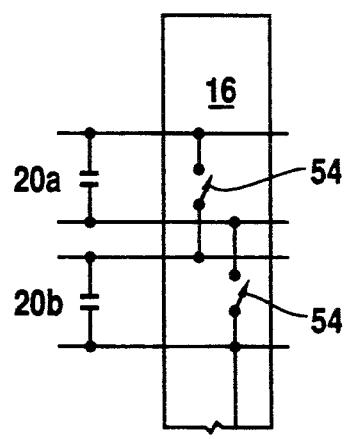
FIG. 5 is a simplified schematic diagram of an electrical control circuit having additional switches for transferring electrical charge among actuators.

FIG. 5 illustrates the addition of switches 54 to controller 16 to increase system efficiency by selectively transferring electric charge from a fully charged actuator that has finished its power stroke, such as piezoelectric body 20a, to an uncharged actuator that is about to begin its power stroke, such as piezoelectric body 20b. Thus, overall efficiency of the motor of the present invention can be optimized by actuator cycle time adjustment in conjunction with switching circuitry to achieve a high degree of actuator charge sharing.

Figure 6:
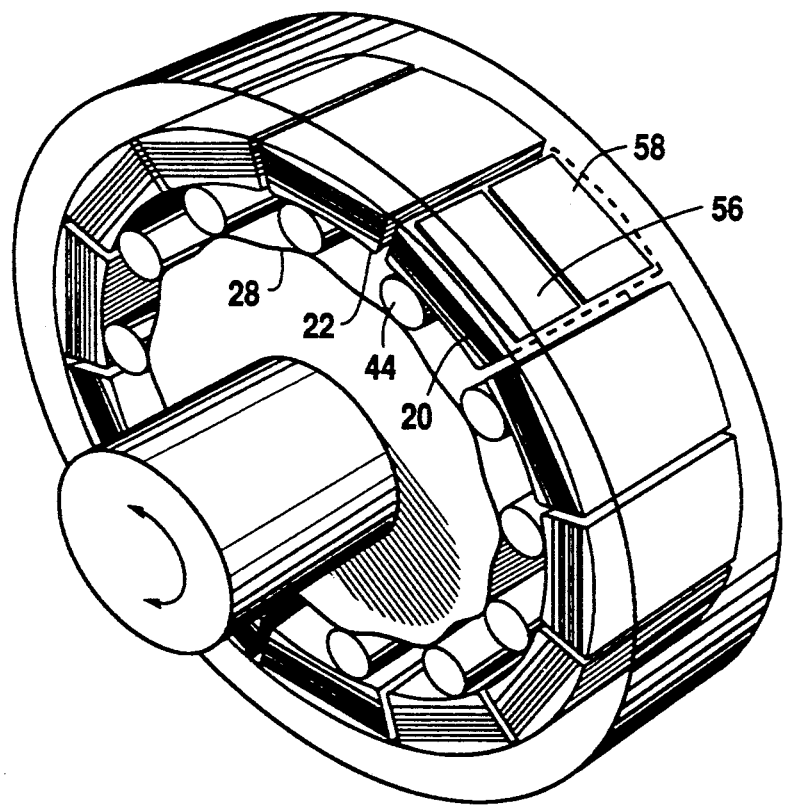
FIG. 6 is a perspective view of an alternative embodiment of a piezoelectric motor of the present invention.

FIG. 6 illustrates an embodiment of the present invention that includes rollers 44 disposed between the actuator crowns 22 and the shaft undulations 28. In this embodiment, crowns 22 have a curved inner contact surface, the shape of the curve designed in conjunction with undulations 28 for optimum power transfer from actuator crowns 22, through cylindrical rollers 44, to shaft undulations 28. The number of rollers 44 must be equal to or less than the number of actuator crowns 22 because each actuator can control the position of only one roller 44 at a time. The intimate geometric relationship between roller diameter and the effective diameter of crowns 22 requires continuous adjustment of the crowns 22 by application of a slowly varying electric charge, superimposed on the normal operating signals, to all of the actuators. This slowly varying charge can also compensate for factors such as wear and differential thermal expansion.

In the embodiment illustrated in FIG. 6, feedback signals representative of the positions of rollers 44 and undulations 28 relative to crowns 22 may be used to control the timing and selection of electrical switches, as described above. Rollers 44 may be kept parallel to the axis of the shaft by conventional roller bearing retainers, for example. Alternatively, independently addressable piezoelectric shear or thickness mode segments 56 and 58 may be activated at appropriate times to apply a moment about the normal to the roller axis or to make incremental adjustments to roller spacing, as necessary. Active roller positioning eliminates friction losses associated with mechanical roller retainers.

An advantage of the piezoelectric motor of the present inventin is the ability to use batteries and solid state switches rather than more elaborate circuitry such as converters, filters, and amplifiers. Embodiments of the motor that do not use acoustic excitation have the advantage of quiet running. High efficiency is derived from the minimal dissipation of stored energy in the motor. The motor does not require the use of ferromagnetic materials and, therefore, functions in a strong magnetic fields. Because of the well known reciprocity of piezoelectric materials, and with appropriate modification of the electrical control circuits, the invention can also operate as a generator for converting mechanical energy to electrical energy, as is well known in the art.

Although the present invention has been described with respect to specific embodiments thereof, various changes and modifications may be suggested to one skilled in the art. Therefore, it is intended that the present invention encompass such changes and modifications as fall within the scope of the appended claims.

I claim:

1. A piezoelectric motor, comprising:

a motor housing;

a motor shaft having an axis and a surface with a plurality of sloped undulations, said shaft extending within said housing and rotatable about its axis;

at least two piezoelectric actuators rigidly fixed within said housing;

activating means connected to said actuators for inducing said actuators to move radially appling a radial force toward the axis of said shaft, said actuator directly contacting the sloped undulation of said shaft surface, the sloped undulation translating the radial force into tangential force to rotate said shaft;

wherein the actuators are positioned such that at least one actuator is in force applying contact with a slopped undulation of said shaft surface at all times.

2. The piezoelectric motor of claim 1, wherein said actuator comprises:

a body of piezoelectric material;

an actuator base for connecting said piezoelectric body to said housing; and a crown attached to said piezoelectric body opposite said base, said crown for contacting the sloped undulation of said shaft surface.

3. The piezoelectric motor of claim 2, wherein said piezoelectric body comprises a plurality of coupled piezoelectric segments and said activating means is connected to each of said segments.

4. The piezoelectric motor of claim 2, further comprising a rolling element disposed between said crown and said shaft surface.

5. The piezoelectric motor of claim 4, wherein said rolling element comprises a roller seated within said crown and extending therefrom to provide rolling contact with said shaft surface.

6. The piezoelectric motor of claim 2, wherein said undulations have sinu-exponential slopes and said activating means comprises a source of constant electric potential connectable to said actuators.

7. The piezoelectric motors of claim 2, wherein said undulations have a predetermined slope and said activating means comprises electrical circuitry for matching said induced actuator force to said predetermined slope.

8. The piezoelectric motor of claim 2, wherein said activating means includes means for switching electric charge among said actuators.

9. A rotary piezoelectric motor, comprising:

a motor housing;

a motor shaft having an axis and a surface with a plurality of sloped undulations, said shaft extending within said housing and rotatable about its axis;

a plurality of piezoelectric actuators rigidly fixed within said housing and surrounding the surface of said shaft, each of said actuators comprising a body having at least one segment of piezoelectric material, an actuator base connecting said piezoelectric body to said housing, and a crown attached to said piezoelectric body opposite said base;

a plurality of rolling elements, each of said rolling elements disposed between a corresponding one of said crowns and said shaft base;

activating means connected to each of said piezoelectric segments for inducing said actuators to move radially applying radial force toward the axis of said shaft said actuator directly contacting the sloped undulations of said shaft surface, the sloped undulations translating the radial force into tangential force to rotate said shaft.

10. The rotary piezoelectric motor of claim 9, wherein said activating means comprises a source of electric potential and means for switching said electric potential to said plurality of piezoelectric.

11. The rotary piezoelectric motor of claim 10, further comprising:

a tangentially acting piezoelectric segment coupled to each of said actuator bodies; and said actuating means including means for inducing said tangentially acting segments to provide tangential force to said shaft surface at motor start-up to initiate shaft rotation.

12. The rotary piezoelectric motor of claim 10, further comprising a piezoelectric segment coupled to each of said actuator bodies for providing feedback signals to said activating means.

* * * * *